J. U. DE UHERKÓCZ.
WHEEL FRAME FOR BABY CARRIAGES.
APPLICATION FILED MAR. 12, 1914.

1,119,002.

Patented Dec. 1, 1914.
2 SHEETS—SHEET 1.

J. U. DE UHERKÓCZ.
WHEEL FRAME FOR BABY CARRIAGES.
APPLICATION FILED MAR. 12, 1914.
1,119,002.
Patented Dec. 1, 1914.
2 SHEETS—SHEET 2.
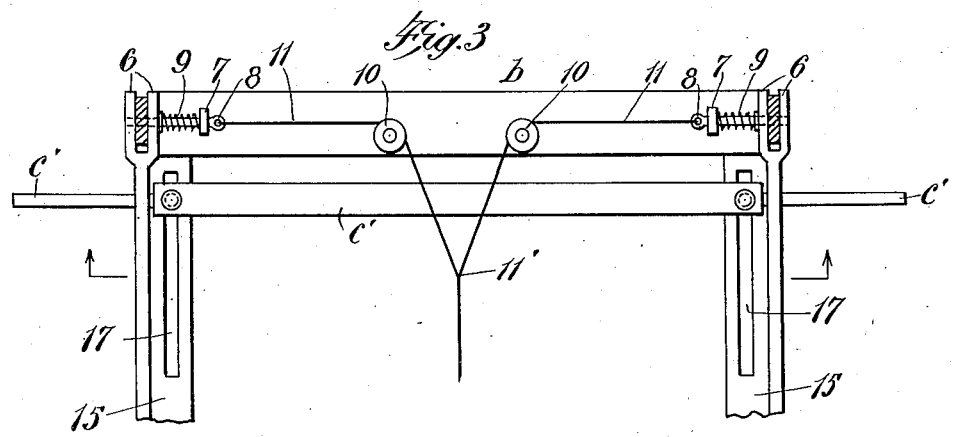
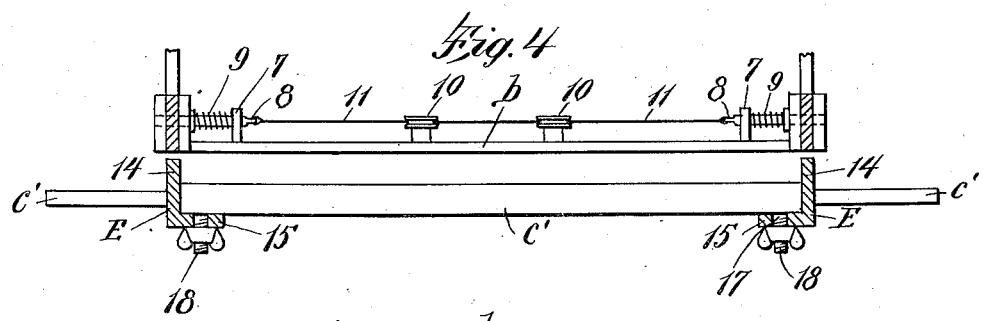
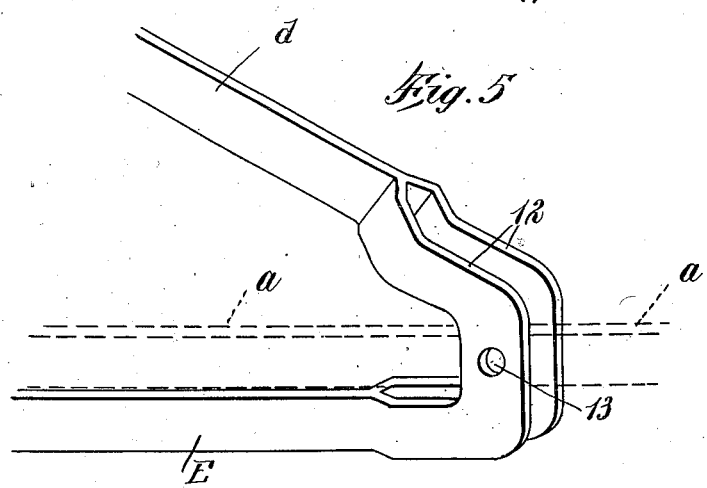
WITNESSES
E. A. Joyner
M. F. Terry
INVENTOR
Julius Uherkovich de Uherkócz
BY
F. N. Gilbert
ATTORNEY

UNITED STATES PATENT OFFICE.

JULIUS UHERKOVICH DE UHERKÓCZ, OF BARNESBORO, PENNSYLVANIA.

WHEEL-FRAME FOR BABY-CARRIAGES.

1,119,002.      Specification of Letters Patent.      Patented Dec. 1, 1914.

Application filed March 12, 1914. Serial No. 824,275.

*To all whom it may concern:*

Be it known that I, JULIUS UHERKOVICH DE UHERKÓCZ, a citizen of the United States, residing at Barnesboro, in the county of Cambria and State of Pennsylvania, have invented certain new and useful Improvements in Wheel-Frames for Baby-Carriages, of which the following is a specification.

My invention relates to improvements in adjustable wheel frames for children's carriages and it has for its object to provide a carriage frame so constructed as to enable the carriage to be readily moved up and down stairs supported by the front as well as the rear wheels in an inclined position on the grade of the stairs while the carriage body is held level from step to step.

With this object in view my invention consists of certain novel features of construction and arrangement of parts as will be hereinafter described and pointed out in the claim, reference being had to the accompanying drawings in which—

Figure 1:
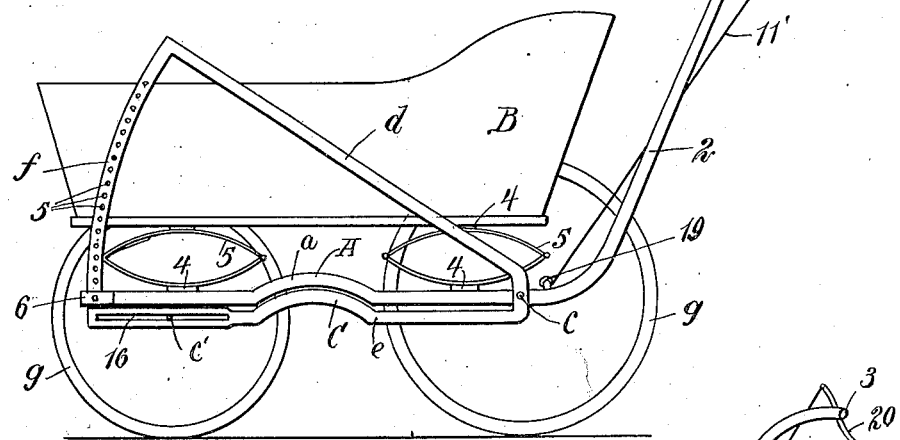
Figure 2:
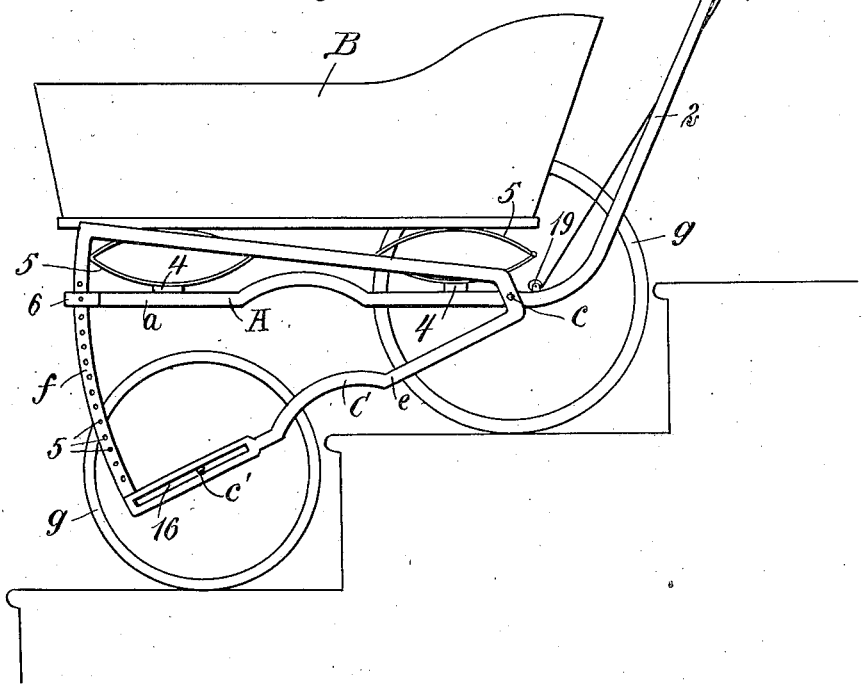

Figure 1 is a side view in perspective of my device. Fig. 2 is a side view in perspective, of my device. Fig. 3 is a plan view of a part of my device. Fig. 4 is an end view of a part of my device and Fig. 5 is a perspective view of a fragmentary part of my device.

The same reference characters denote like parts in each of the several figures of the drawings.

In carrying out my invention I provide a body support frame A composed of the side bars *a. a* which frame A has projecting from it the usual carriage handle support 2. 2 and having mounted thereon the usual handle bar 3. Mounted on the side bars *a. a* of the frame A are the cross bars 4. 4 and mounted on these cross bars, 4. 4 are the usual carriage springs 5. 5 supporting the carriage body B. Between the side bars *a. a* I have the front end bar *b*. At the rear end of the side bars *a. a* and mounted in the same I have the rear carriage axle *c*. Pivotally mounted on the axle *c* I have the side frames C. C, one on either side, and each composed of the upper bar *d* and the lower bar *e* and between the ends of bar *d* and bar *e* extends the perforated curved connecting bar *f* having the perforations or bolt holes 5. 5. 5, etc. Each side bar *a. a* has the forked shaped end projections 6. 6 and between which the curved bar *f* passes. Mounted on end bar *b* I have the lugs 7. 7 and between the inner fork projections 6. 6 and lug 7 I have mounted the spring bolts 8. 8 encircled by the coil spring 9. Mounted on the end bar *b*, I have also pivotally mounted the pulley wheels 10. 10, and attached to the spring bolts 8. 8 I have the cords 11. 11 which pass around the pulleys 10. 10. The rear end of the side frames C. C is in bifurcated formation as shown in Fig. 5 and having the projecting sides 12. 12 through both of which is the opening 13 and through which opening passes the rear axle *c*. Through this bifurcated end projection of side frames C. C passes the side bars *a. a*. The side frame C being pivotally mounted over the same by means of the axle *c*, passing through the opening 13 in sides 12. 12 of the bifurcated end. The bar *e* of side frame C projects in angular formation as shown in Fig. 4, it having the vertical side 14 and a projecting lateral flange 15. Through the vertical side 14 is the slot 16 and through the flange 15 is the slot 17. Adjustably mounted between the bars *e. e* is the front carriage axle *c'* which carriage axle *c'* passes through the side slot 16. On the lower side of the axle *c'* are the nut bolts 18. 18 passing through slot 17. The cords 11. 11 are joined to cord 11' which passes up under pulley 19 mounted in any convenient manner and connects with the lever 20 mounted on the handle bar 3.

In the operation of my device when the carriage is on a level surface the side frames C. C are in a raised position so as to bring the axle bar *e* parallel to and beneath the side frame A and there held in position by the spring bolts 8. 8. When it is desired to pass down a pair of stairs I take hold of the handle bar 3 in the usual manner. I press the lever 20 which pulls the cord 11' which in turn pulls out the spring bolts 8. 8. from the openings 5. 5. in the bar *f* and the bar *f* is thus released and the supporting frame of the front axle wheels *g. g* is dropped to the grade of the stairs or the next lower step without changing the poise of the carriage body. Then I again release the spring bolts 8. 8. and they again enter into the opposite opening 5 and there firmly hold the wheel frame C to the grade of the stairs which I descend and which permits the front carriage wheels to drop from one step to the other and thus permits all four wheels of the carriage to continually rest on and follow the treads of the stairs as the descent is made and the carriage is thus steadied in its descent and the front end of the carriage is firmly supported in a level position without strain or effort on the part of the holder while the wheels of the carriage are pitched to conform to the angle or grade of the stairs as before stated. At the bottom of the stairs I again pull back the spring bolts 8. 8. from the openings 5. 5. and the bar $f$ and the frame C is drawn up parallel to the frame A. Bolts are again released and pass through the opposite opening 5. 5. which holds the entire wheel frame in normal position for wheeling on the level surface. When ascending the stairs I pull out the bolts 8. 8., press down on handle bar 3, raising the front end of the frame A and thus drop the bar $f$ and frame C to the grade of the steps. I again release bolts 8. 8. which enter the opening 5. 5. in the upper end of bar $f$, which holds the wheel frame C to the grade of the stairs and thus all four carriage wheels are brought in contact with the stair treads, forming a safety support during the entire ascent.

Having thus described my invention, what I claim as new and for which I desire Letters Patent is as follows:

In a wheel frame for baby carriages two parallel handle bar extensions; springs mounted thereon for the carriage body; the front end of said bars slotted and a front cross bar connecting said extension bars; the rear wheel axle passing through said parallel extension bars and mounted therein; pivotally and vertically mounted on said rear axle on each side extension bar a triangular frame; each frame vertically parallel with the side of the carriage body; the front side of said frame perforated and extending through said extension bar slot; the lower side of said triangular frame slotted, the front carriage axle adjustably mounted in said slot; spring bolts mounted in said cross bar adapted to meet and pass through said slotted end of the extension bars and through the opening in said triangular frame; the pulleys mounted on said cross bar; cords attached to said spring bolts and passing over said pulleys and then uniting in a single cord which connects with a lever mounted on the handle bar and adapted to move said spring bolts all for the purpose described.

In testimony whereof I have affixed my signature in presence of two witnesses.

JULIUS UHERKOVICH de UHERKÓCZ.

Witnesses:
WILLIAM F. DILL,
O. C. JONES.